(12) United States Patent
Yana (10) Patent No.: US 8,634,013 B2
(45) Date of Patent: Jan. 21, 2014

(54) IMAGING APPARATUS AND PROGRAM

(75) Inventor: Kanako Yana, Tokyo (JP)

(73) Assignee: Sony Corporation, Tokyo (JP)

( * ) Notice: Subject to any disclaimer, the term of this patent is extended or adjusted under 35 U.S.C. 154(b) by 368 days.

(21) Appl. No.: 13/023,852

(22) Filed: Feb. 9, 2011

(65) Prior Publication Data

US 2011/0234878 A1    Sep. 29, 2011

(30) Foreign Application Priority Data

Mar. 26, 2010   (JP) ................................. 2010-071704

(51) Int. Cl.
*H04N 5/222*   (2006.01)

(52) U.S. Cl.
USPC .................................................... 348/333.01

(58) Field of Classification Search
USPC .................. 348/333.01, 333.05, 141, 207.99; 345/241, 214, 173
See application file for complete search history.

(56) References Cited

U.S. PATENT DOCUMENTS

| 7,743,348 B2 * | 6/2010 | Robbins et al. ................ 715/863 |
| 8,130,211 B2 * | 3/2012 | Abernathy ..................... 345/176 |
| 8,373,788 B2 * | 2/2013 | Ozawa et al. ............. 348/333.05 |
| 2005/0231600 A1 | 10/2005 | Caruhel et al. |
| 2007/0097086 A1 | 5/2007 | Battles et al. |
| 2007/0291177 A1 | 12/2007 | Lahoz et al. |
| 2009/0041295 A1 | 2/2009 | Matsuzaka et al. |
| 2010/0039548 A1 * | 2/2010 | Sakai ....................... 348/333.12 |
| 2010/0103311 A1 | 4/2010 | Makii |

FOREIGN PATENT DOCUMENTS

| EP | 2 154 648 A1 | 2/2010 |
| JP | 2009-290635 | 12/2009 |

OTHER PUBLICATIONS

U.S. Appl. No. 13/069,553, filed Mar. 23, 2011, Yana, et al.
U.S. Appl. No. 13/028,563, filed Feb. 16, 2011, Yana.
Extended European Search Report issued Apr. 16, 2012, in Patent Application No. 11156378.9.

* cited by examiner

*Primary Examiner* — James Hannett
*Assistant Examiner* — Ahmed A Berhan
(74) *Attorney, Agent, or Firm* — Oblon, Spivak, McClelland, Maier & Neustadt, L.L.P.

(57) ABSTRACT

An imaging apparatus includes an imaging unit configured to output an image signal, a detection unit configured to detect a coordinate of a contact position of an instructing body with respect to a display unit which displays an image based on the image signal, and a control unit configured to acquire a starting point coordinate of a starting point which is a position where the instructing body comes into contact with the display unit and an end point coordinate of an end point which is a position where the instructing body loses contact with the display unit and, when the starting point coordinate or the end point coordinate is not at an end portion of a screen of the display unit, cause imaging assist information to be displayed in the display unit such that the imaging assist information reaches at least two end portions of the screen.

12 Claims, 6 Drawing Sheets

IMAGING APPARATUS AND PROGRAM

BACKGROUND OF THE INVENTION

1. Field of the Invention

The present invention relates to an imaging apparatus and a program suitable for application in, for example, causing a display unit to display an image of an object and imaging the object.

2. Description of the Related Art

In imaging apparatuses such as a digital still camera or a digital video camera, there have been advancements in function and resolution. Generally, an imaging apparatus includes a display unit such as a liquid crystal display panel so that an object can be checked immediately. The display unit displays not only an image imaged by the imaging apparatus but also various information (such as exposure adjustment, shutter speed adjustment, or imaging mode) as a guide at the time of imaging. Thus, for imaging, a user can perform adjustment appropriately at the time of imaging while looking at this information.

At times, a level is used as an assist function at the time of imaging a horizon or the like. However, attaching a level to an imaging apparatus is cumbersome. Also, there has been inconvenience in that a level is to be looked at attentively away from a screen. Therefore, there have been times when a horizontal or vertical line (imaging assist line) displayed in a display screen is used for imaging.

Also, there has been a technique of drawing a straight line from a trajectory when a line is drawn by hand on a touch panel by a user. In this technique, a straight line is displayed along a direction in which a finger or the like has stroked a display unit from end to end.

Japanese Unexamined Patent Application Publication No. 2009-290635 discloses a technique of drawing an imaging assist line in a display unit.

SUMMARY OF THE INVENTION

However, displaying an imaging assist line on a display screen consumes time and energy since normally an imaging mode is to be switched to a display mode through an operation in menu or the like. Also, even if a system of drawing a line by hand on a touch panel is applied to an imaging apparatus, an imaging assist line is drawn only when a finger or the like strokes the touch panel fully from end to end. Therefore, drawing an imaging assist line has been time-consuming.

In the technique described in Japanese Unexamined Patent Application Publication No. 2009-290635, a horizon included in an image taken as an object by an imaging unit and displayed in a display unit is distinguished to display an imaging assist line. Therefore, the dependence of the imaging assist line upon the image has caused difficulty in drawing the imaging assist line where intended by a user.

Thus, it is desirable to display an imaging assist information in a display unit through an intuitive operation by a user.

In an embodiment of the present invention, an image signal is output, and a coordinate of a contact position of an instructing body with respect to a display unit which displays an image based on the image signal is detected.

Next, a starting point coordinate of a starting point which is a position where the instructing body comes into contact with the display unit and an end point coordinate of an end point which is a position where the instructing body moves to and loses contact with the display unit are acquired.

Next, when the starting point coordinate or the end point coordinate is not at an end portion of a screen of the display unit, imaging assist information is displayed in the display unit such that the imaging assist information for assisting imaging reaches at least two end portions of the screen.

Accordingly, the imaging assist information can be displayed in the display unit based on an operation of the instructing body in contact with the display unit.

According to the embodiment of the present invention, a user can cause the imaging assist information to be displayed in the display unit merely by causing the instructing body to contact the display unit and performing an intuitive operation of moving the instructing body in an arbitrary direction. At this time, the imaging assist information is displayed in the display unit such that the imaging assist information for assisting imaging reaches at least two end portions of the screen, even when the starting point coordinate or the end point coordinate is not at the end portion of the screen. Therefore, the user can cause the imaging assist information to be displayed merely through contact of the instructing body with the display unit, without an additional operation. Also, the imaging assist information can be displayed even if the instructing body is not moved to reach at least two end portions of the screen, thus providing an effect that an imaging operation is not disturbed.

DESCRIPTION OF THE PREFERRED EMBODIMENTS

A best mode (referred to below as an embodiment) for carrying out the invention will be described in the following order.
1. An embodiment (a display control of an imaging assist line: example of displaying the imaging assist line in a stroking direction of a finger)
2. Modification example

1. An Embodiment

Example of Displaying an Imaging Assist Line in a Stroking Direction of a Finger An embodiment of the present invention will be described below with reference to the accompanying drawings. In this embodiment, an example of application in an imaging apparatus 100 for which an input operation is possible via a touch panel will be described.

Figure 1:
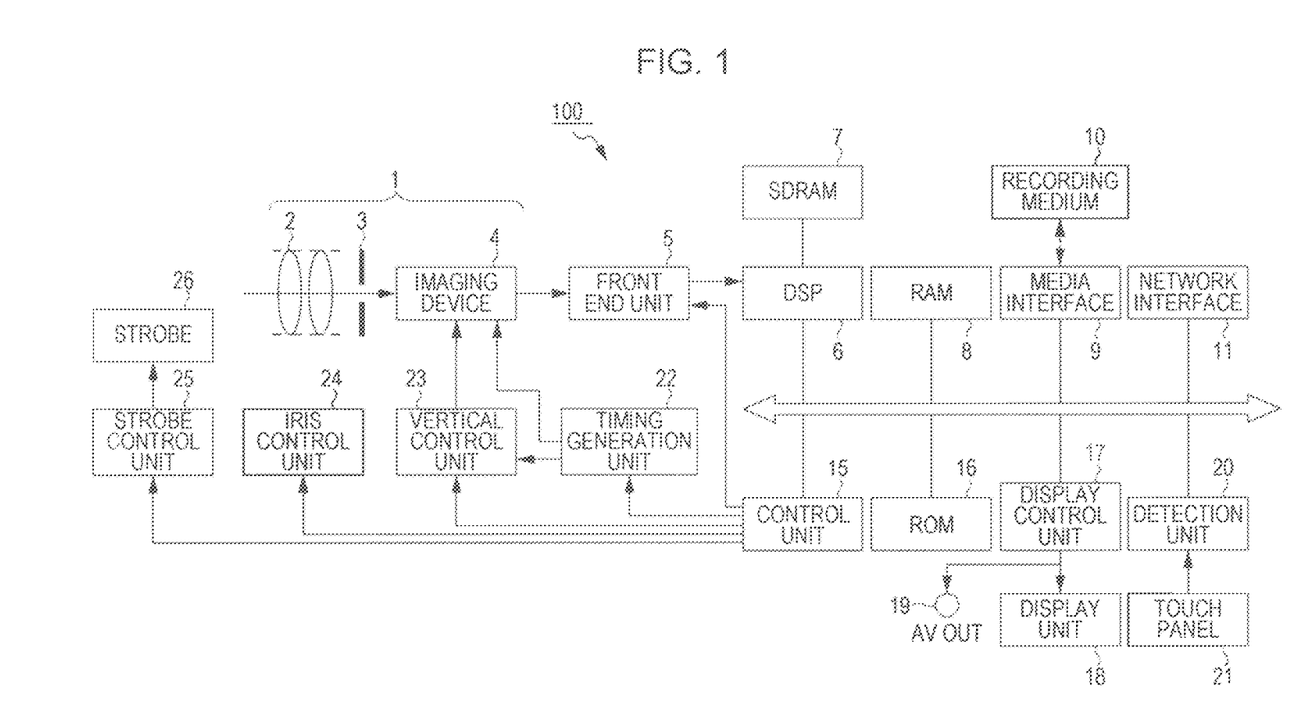
FIG. 1 is a block diagram showing an internal configuration example of an imaging apparatus according to an embodiment of the present invention.

FIG. 1 shows an internal configuration example of the imaging apparatus 100.

The imaging apparatus 100 includes an imaging unit 1 which outputs, as an image signal, image light of an image formed on an imaging device 4 via an optical system 2 including multiple lenses, a mechanical shutter, and an aperture to transmit image light of an object. The imaging unit 1 includes the optical system 2, a shutter/iris 3 which performs a shutter operation on image light transmitted via the optical system 2, and the imaging device 4 which outputs an analog image signal according to image light of a formed image. A charge-coupled device (CCD) imager or a complementary metal-oxide-semiconductor (CMOS) sensor is used as the imaging device 4, for example.

Also, the imaging apparatus 100 includes a front end unit 5 which adjusts exposure or gain of the analog image signal input from the imaging device 4 and a DSP 6 which performs predetermined signal processing on a digital image signal output from the front end unit 5. The DSP 6 includes a synchronous dynamic random access memory (SDRAM) 7 used for the signal processing so that a variable, parameter, or the like is written in or read out from the SDRAM 7 as appropriate.

Also, the imaging apparatus 100 includes a RAM 8 used as a work area where various data is temporarily stored and a media interface 9 which performs control of writing or readout of an image obtained from the digital image signal with respect to a recording medium 10 such as a flash memory. A common memory card is used as the recording medium 10. Also, the imaging apparatus 100 includes a network interface 11 which controls a process in which an image is output to or acquired from a computer device, which is not shown, connected via a USB cable.

Also, the imaging apparatus 100 includes a control unit 15 which controls an operation of each processing block and a ROM 16 which stores a program or the like. Also, the imaging apparatus 100 includes a display control unit 17 which displays an image in a display unit 18 based on the digital image signal and an image output unit 19 which is connected to the display control unit 17 and outputs the image to an external monitor or the like. Also, the imaging apparatus 100 includes a touch panel 21 on which a user performs an operation input with an instructing body and a detection unit 20 which detects a coordinate of a contact position of the instructing body (a finger of the user, a stylus pen, or the like) with respect to the display unit 18 which displays an image based on the image signal. The size of the touch panel 21 is 3 to 3.5 inches, and the screen aspect ratio is 16:9.

Also, the imaging apparatus 100 includes a timing generation unit 22 which generates a timing signal for synchronization of an operation timing of each unit according to a control by the control unit 15 and a vertical control unit 23 which controls a vertical readout of the imaging device 4. The vertical control unit 23 synchronizes with the timing signal supplied from the timing generation unit 22 to read out the analog image signal from the imaging device 4. Also, the imaging apparatus 100 includes an iris control unit 24 which controls an operation timing of the shutter/iris 3 and a strobe control unit 25 which controls a timing of light emission by a strobe 26 which irradiates an object with stroboscopic light.

Next, the operation of each unit of the imaging apparatus 100 will be described.

When the user presses a shutter button or the like, which is not shown, the control unit 15 causes the shutter/iris 3 to perform an iris operation and a shutter operation. Also, when the surrounding environment is dark, the control unit 15 controls the strobe control unit 25 to cause the strobe 26 to emit stroboscopic light. A program run by the control unit 15 is read out from the ROM 16 as appropriate and a control parameter or the like is written in the RAM 8 to execute a process.

The shutter/iris 3 adjusts the amount of image light of an object which has passed through the optical system 2 to form an image on the imaging device 4. The imaging device 4 outputs an analog image signal according to image light of the formed image, and the front end unit 5 converts the analog image signal to a digital image signal and performs a process of removing noise or amplifying the digital image signal. The control unit 15 determines the timing at which the analog image signal is read out from the imaging device 4 or the timing at which the digital image signal is output by the front end unit 5. Upon receiving the digital image signal from the front end unit 5, the DSP 6 performs various correction processes and stores an image, based on the digital image signal output via the media interface 9, in the recording medium 10.

Also, the DSP 6 outputs the digital image signal to the display control unit 17 to cause the display unit 18 to display a live preview image of the object which is yet to be stored in the recording medium 10 by the shutter operation. Also, the user can set the operation of the imaging apparatus 100 by causing the instructing body to contact the touch panel 21. Such settings include switching a menu screen and changing an imaging mode. Then, upon receiving the coordinate of the instructing body which has contacted the touch panel 21 from the detection unit 20, the control unit 15 causes each unit to operate according to the instruction. Also, the control unit 15 performs a control of causing the display control unit 17 to display various information in the display unit 18.

Also, the control unit 15 acquires from the detection unit 20 a starting point coordinate of a starting point which is a position where the instructing body comes into contact with the display unit 18 (the touch panel 21) and an end point coordinate of an end point which is a position where the instructing body moves to and loses contact with the display unit 18 (the touch panel 21). Then, when the starting point coordinate or the end point coordinate is not at an end portion of a screen of the display unit 18, the display control unit 17 is instructed to display an imaging assist information in the display unit 18 such that the imaging assist information for assisting imaging reaches at least two end portions of the screen. At this time, the control unit 15 causes the display unit 18 to display an imaging assist line as the imaging assist information to reach at least two end portions of the screen.

Also, when a USB cable is connected to the network interface 11, the control unit 15 outputs the image read out from the recording medium 10 according to an instruction from an external computer device or the like to the network interface 11.

Figure 2:
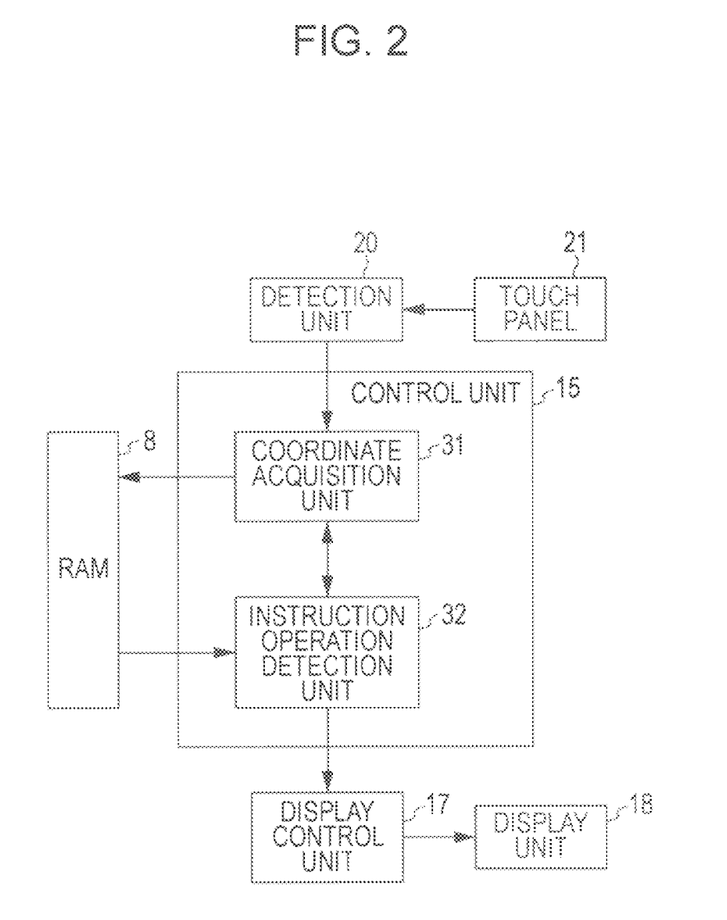
FIG. 2 is a block diagram showing an internal configuration example of a control unit according to the embodiment of the present invention.

FIG. 2 shows an internal configuration example of the control unit 15.

The control unit 15 includes a coordinate acquisition unit 31 which acquires a coordinate of the instructing body in contact and on the touch panel 21 from the detection unit 20. The coordinate acquisition unit 31 stores a coordinate of the instructing body at the moment of contact with the touch panel 21 as a starting point position in the RAM 8. Also, the control unit 15 includes an instruction operation detection unit 32 which detects that the instructing body is in a state of contact with the touch panel 21 since the moment at which the coordinate acquisition unit 31 has acquired the coordinate of the starting point position.

Out of coordinates received from the detection unit 20, the starting point position where the instructing body has come into contact with the touch panel 21 is written in a first storage region of the RAM 8 by the coordinate acquisition unit 31. Also, the coordinate acquisition unit 31 continues to acquire the coordinate of the instructing body when the instructing body moves on the touch panel 21 to overwrite a second storage region of the RAM 8 until the instructing body loses contact with the touch panel 21, i.e., until the end point coordinate is reached.

Upon receiving notification that the instructing body has contacted the touch panel 21 from the coordinate acquisition unit 31, the instruction operation detection unit 32 continues to detect a contact state until the instructing body loses contact with and is off the touch panel 21. Then, when the instructing body has reached the end point coordinate and a moving distance obtained from the starting point coordinate and the end point coordinate read out from the RAM 8 is greater than or equal to a threshold value, the instruction operation detection unit 32 detects that an instruction operation in which the instructing body instructs the display unit 18 to display the imaging assist line has been performed. Then, the display control unit 17 is instructed to cause the display unit 18 to display the imaging assist line corresponding to the instruction operation. Then, the display unit 18 displays the imaging assist line on the screen according to the control by the display control unit 17. At this time, the imaging assist line is displayed on the screen of the display unit 18 to reach at least two end portions of the screen.

Figure 3A:
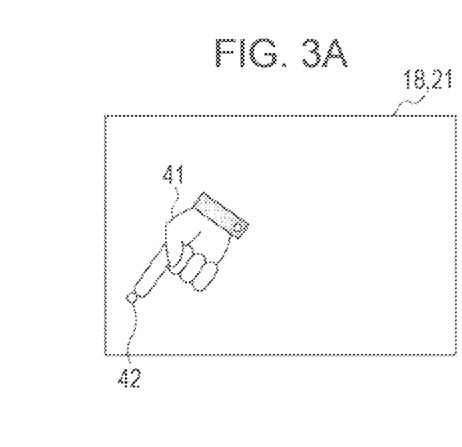
FIGS. 3A to 3C are illustrative views showing an operation example when an imaging assist line is to be displayed in a display unit according to the embodiment of the present invention.
Figure 3B:
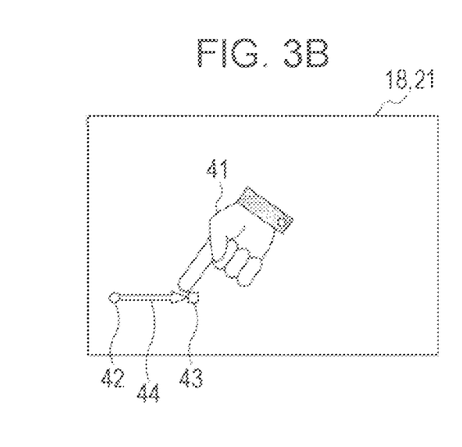
Figure 3C:
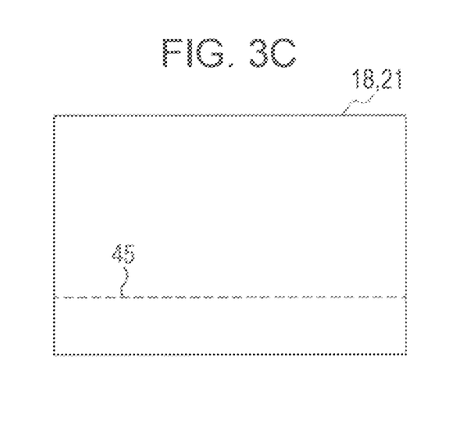

FIGS. 3A to 3C show an operation example when the imaging assist line is to be displayed in the display unit 18.

In this example, the touch panel 21 is arranged over the upper surface of the display unit 18. Therefore, a display range in which the display unit 18 displays an image and a detection range in which the touch panel 21 detects contact of the instructing body are approximately the same. The control unit 15 gives an instruction to display in the display unit 18 a horizontal line parallel to the crosswise direction of the display unit 18 or a vertical line parallel to the lengthwise direction of the display unit 18 which extends through the starting point coordinate and the end point coordinate.

FIG. 3A shows a state where the user has caused a finger 41 to contact the touch panel 21.

The coordinate where the finger 41 has contacted the touch panel 21 for the first time is set as a starting point position 42. Although the finger 41 will be described below as the instructing body, another instructing body such as a stylus pen may also be used.

FIG. 3B shows a state where the user has stroked the touch panel 21 with the finger 41 in the crosswise direction while in contact.

When the finger 41 is in contact with the touch panel 21, the coordinate acquisition unit 31 continues to write the acquired coordinate of the finger 41 in the RAM 8. Then, when the finger 41 loses contact with the touch panel 21, the coordinate where the contact is lost is set as an end point position 43. Then, the instruction operation detection unit 32 obtains a moving distance 44 of the finger 41 from the starting point position 42 and the end point position 43. Note that the starting point position 42, the end point position 43, and the moving distance 44 are shown for descriptive purposes, and these icons are not displayed in the display unit 18 while the finger 41 is moving.

FIG. 3C shows a state where an imaging assist line 45 is displayed in the display unit 18.

When the moving distance 44 exceeds a threshold value, the instruction operation detection unit 32 recognizes that the user has intentionally performed an operation to display the imaging assist line and instructs the display unit 18 to display the imaging assist line 45. Accordingly, the imaging assist line 45 is displayed as a straight line in the same direction as the moving direction of the finger 41.

Figure 4A:
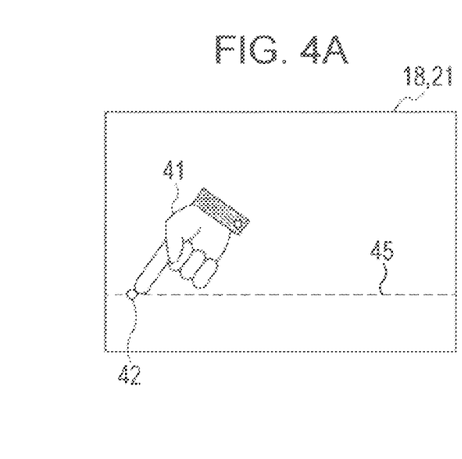
FIGS. 4A to 4C are illustrative views showing an operation example when an imaging assist line is to be erased from the display unit according to the embodiment of the present invention.
Figure 4B:
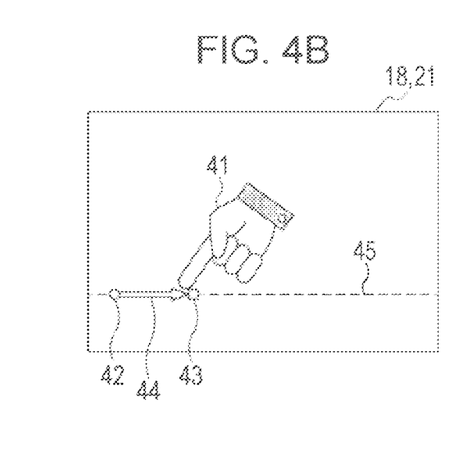
Figure 4C:
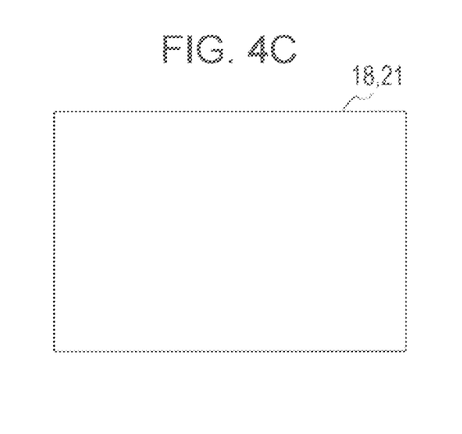

FIGS. 4A to 4C show an operation example when the imaging assist line is to be erased from the display unit 18.

When the instructing body has performed a predetermined operation with respect to the imaging assist information (imaging assist line) displayed in the display unit 18, the control unit 15 gives an instruction to erase the imaging assist information from the display unit 18. In this example, the control unit 15 gives the instruction to erase the imaging assist line from the display unit 18 when, as the predetermined operation, the instructing body in contact has moved a predetermined moving distance along the imaging assist line displayed in the display unit 18. Note that, when a line segment connecting the starting point coordinate and the end point coordinate crosses the imaging assist line displayed in the display unit 18, the control unit 15 may give an instruction to erase the imaging assist line crossed by the line segment.

FIG. 4A shows a state where the user has caused the finger 41 to contact the touch panel 21.

When the imaging assist line 45 displayed in the display unit 18 is to be erased, the finger 41 is placed on the imaging assist line 45. At this time, the coordinate where the finger 41 is placed is set as the starting point position 42.

FIG. 4B shows a state where the user has stroked the touch panel 21 with the finger 41 along the imaging assist line 45 while in contact.

When the finger 41 is in contact with the touch panel 21, the coordinate of the finger 41 continues to be written in the RAM 8 until the finger 41 loses contact with the touch panel 21, as described with reference to FIG. 3B. When the finger 41 loses contact with the touch panel 21, the instruction operation detection unit 32 obtains the moving distance 44 of the finger 41.

FIG. 4C shows a state where the imaging assist line 45 is erased from the display unit 18.

When the moving distance 44 in FIG. 4B exceeds a threshold value, the instruction operation detection unit 32 recognizes that the user has intentionally performed an operation to erase the imaging assist line and instructs the display unit 18 to erase the imaging assist line 45. Accordingly, the imaging assist line 45 which has been displayed in the same direction as the moving direction of the finger 41 is erased.

Figure 5:
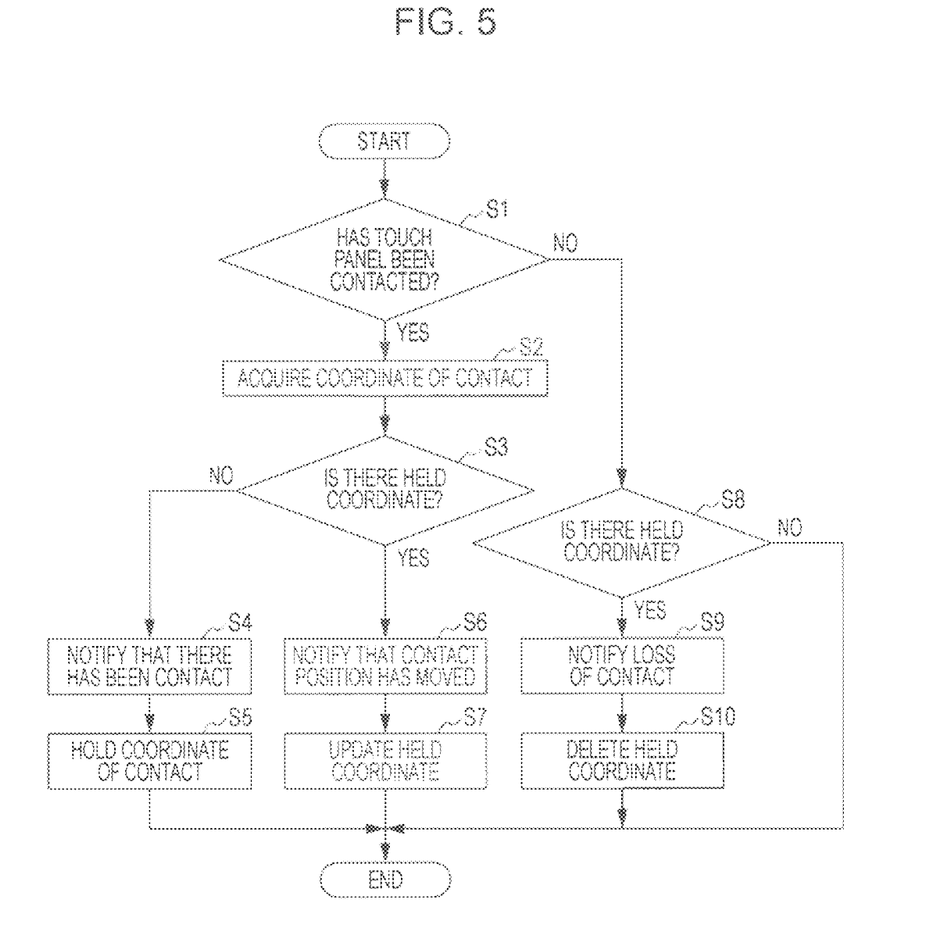
FIG. 5 is a flowchart showing an example of a process in which a coordinate acquisition unit acquires a coordinate according to the embodiment of the present invention.

FIG. 5 shows an example of a process in which the coordinate acquisition unit 31 acquires the coordinate.

First, the coordinate acquisition unit 31 determines whether the instructing body (the finger 41 in this example) has contacted the touch panel 21 (step S1). When it is determined that the instructing body is in contact with the touch panel 21, the coordinate acquisition unit 31 acquires the coordinate of the position where the instructing body has made contact (step S2).

Next, the coordinate acquisition unit 31 determines whether there is a coordinate held in the RAM 8 (step S3). When a coordinate is not held in the RAM 8, the coordinate acquisition unit 31 notifies the instruction operation detection unit 32 that the instructing body has contacted the touch panel 21 for the first time (step S4). Then, the coordinate acquisition unit 31 writes the coordinate of contact in the RAM 8, holds the coordinate as the starting point position (step S5), and terminates the process.

When it is determined that a coordinate held in the RAM 8 exists in a process of step S3, the coordinate acquisition unit 31 notifies the instruction operation detection unit 32 that the position where the instructing body is in contact with the touch panel 21 has moved (step S6). Then, the coordinate acquisition unit 31 writes the coordinate where the instructing body has moved to in the RAM 8, updates the coordinate held by the RAM 8 (step S7), and terminates the process.

When it is determined that the instructing body is not in contact with the touch panel 21 in a process of step S1, the coordinate acquisition unit 31 determines whether there is a coordinate held in the RAM 8 (step S8). When there is a coordinate held in the RAM 8, the coordinate acquisition unit 31 notifies the instruction operation detection unit 32 that the instructing body has lost contact with the touch panel 21 (step S9). Then, the coordinate acquisition unit 31 clears the coordinate held in the RAM 8 and terminates the process (step S10).

When it is determined that a coordinate is not held in the RAM 8 in a process of step S8, the coordinate acquisition unit 31 terminates the process.

Figure 6:
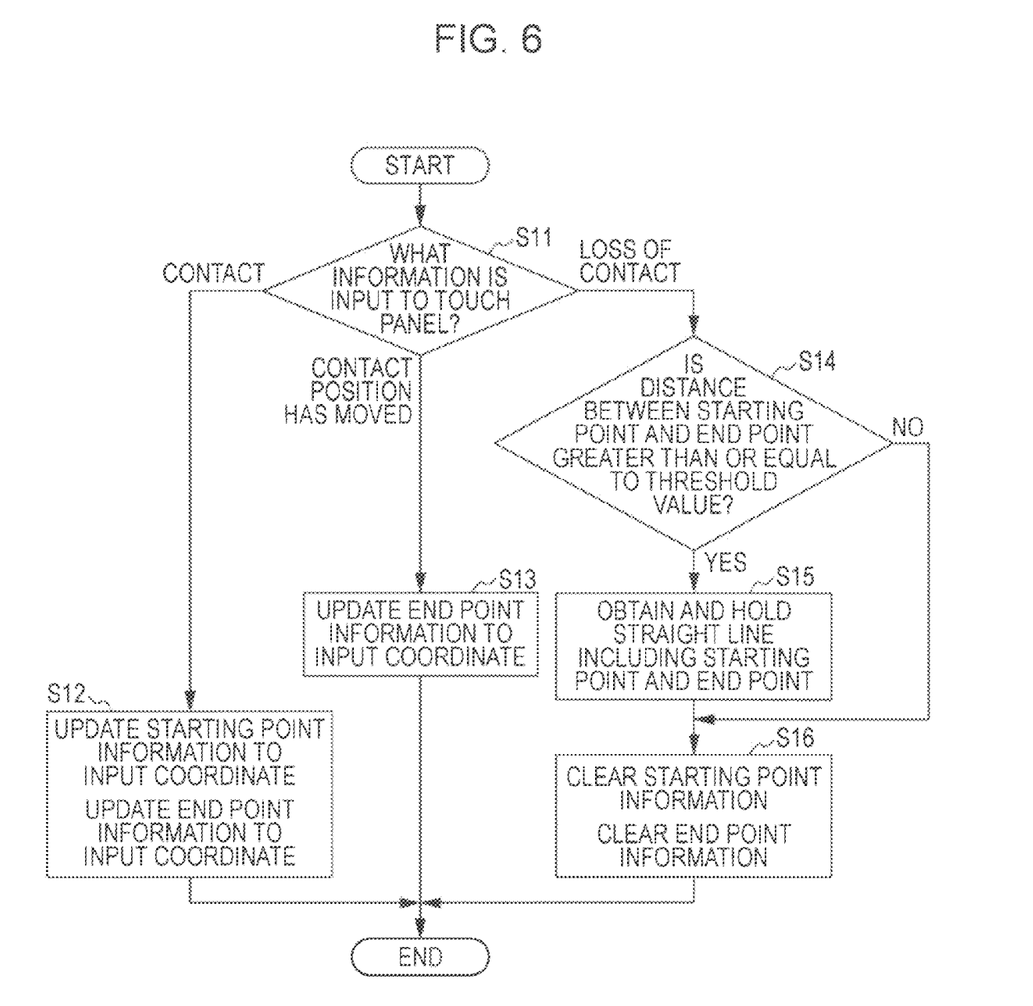
FIG. 6 is a flowchart showing an example of a process in which the coordinate acquisition unit writes information in a memory according to the embodiment of the present invention.

FIG. 6 shows an example of a process in which the coordinate acquisition unit 31 writes information in the RAM 8.

First, based on information received from the coordinate acquisition unit 31, the instruction operation detection unit 32 determines information input to the touch panel 21 (step S11). Then, when it is determined that the instructing body has contacted the touch panel 21, the instruction operation detection unit 32 notifies the coordinate acquisition unit 31 that the instructing body has contacted the touch panel 21. Then, the coordinate acquisition unit 31 updates starting point information and end point information to the coordinate (referred to as input coordinates) at the time the instructing body has made contact (step S12) and terminates the process.

When it is determined that the instructing body has moved on the touch panel 21 in a process of step S11, the instruction operation detection unit 32 notifies the coordinate acquisition unit 31 that the instructing body has moved on the touch panel 21. Then, the coordinate acquisition unit 31 updates the end point information to the input coordinate (step S13) and terminates the process.

When it is determined that the instructing body has lost contact with the touch panel 21 in the process of step S11, the instruction operation detection unit 32 determines whether the distance between the starting point and the end point (the moving distance of the instructing body) is greater than or equal to a threshold value (step S14).

When it is determined that the distance between the starting point and the end point is greater than or equal to the threshold value, the instruction operation detection unit 32 notifies the coordinate acquisition unit 31 that the distance between the starting point and the end point is greater than or equal to the threshold value. Then, the coordinate acquisition unit 31 obtains a straight line which extends through the starting point and the end point and holds position information of this straight line in the RAM 8 (step S15). Then, the starting point information and the end point information are cleared from the RAM 8 (step S16), and the process is terminated.

When it is determined that the distance between the starting point and the end point is less than the threshold value, the instruction operation detection unit 32 skips step S15, clears the starting point information and the end point information from the RAM 8 (step S16), and terminates the process.

Figure 7A:
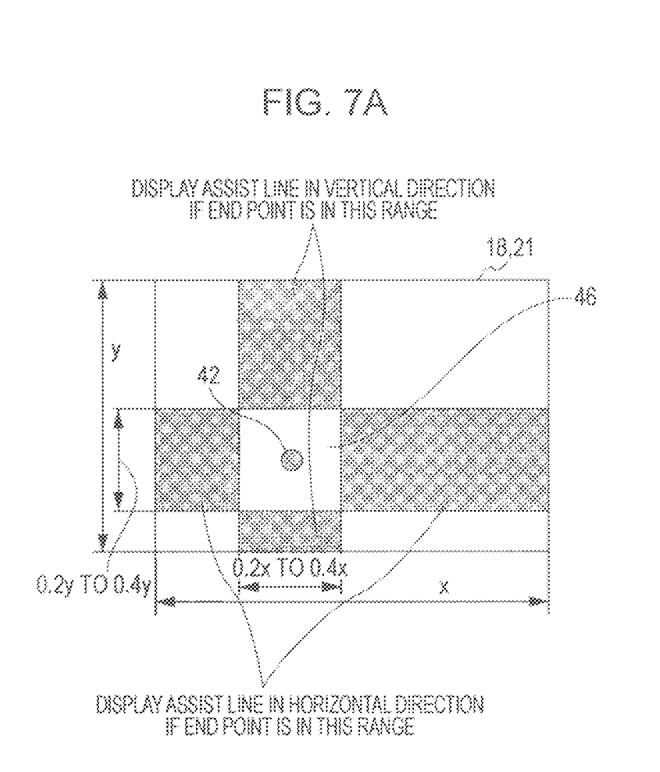
FIGS. 7A and 7B are illustrative views showing an example of determining the direction of a stroke operation according to the embodiment of the present invention.
Figure 7B:
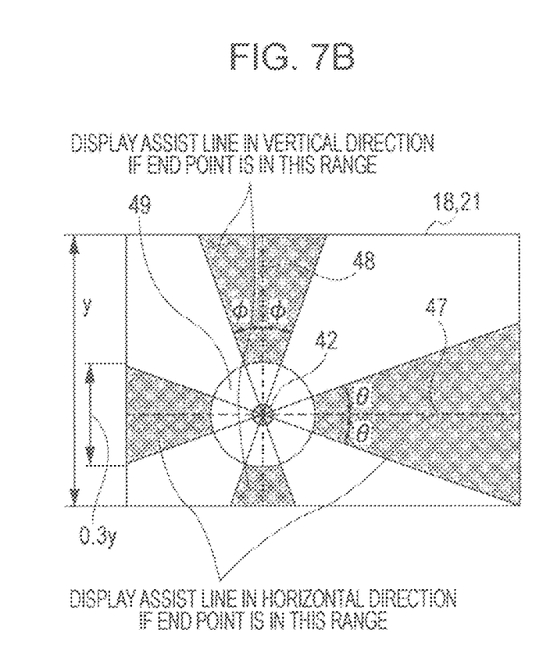

FIGS. 7A and 7B show an example of determining the direction of a stroke operation.

Based on input information acquired by the process shown in FIG. 5, the control unit 15 obtains the starting point (point where touched) and the end point (point where contact is lost) of the stroke operation on the touch panel 21, as shown in FIG. 6. At this time, when the starting point and the end point is apart by a certain distance or greater and the inclination of a line segment connecting the starting point and the end point is within a certain range, a horizontal or vertical imaging assist line is displayed according to the inclination.

FIG. 7A shows an example of a first recognition pattern in which the control unit 15 recognizes the starting point and the end point.

In the first recognition pattern, the control unit 15 gives an instruction to display the imaging assist line in the display unit 18 when the end point coordinate is included within a region having a certain width in the lengthwise direction and the crosswise direction of the display unit 18 with the starting point coordinate as the center.

Also, in the first recognition pattern, the control unit 15 gives an instruction to not display the imaging assist line in the display unit 18 when the moving distance of the instructing body is within a range of 20% to 40% with respect to each side of the display unit 18 in the lengthwise direction and the crosswise direction. In this example, a detection region of the end point is set to a range having respective widths of 0.2x to 0.4x and 0.2y to 0.4y, where x represents the length of one side of the touch panel 21 in the crosswise direction and y represents the length of one side in the lengthwise direction, with a starting point 42 as the center. Therefore, when the instructing body 41 has lost contact with the touch panel 21 within the detection region and the end point has been detected, the control unit 15 recognizes that the user has intentionally given an instruction to draw the imaging assist line. At this time, the control unit 15 instructs the display control unit 17 to draw the imaging assist line parallel to the lengthwise or crosswise direction of the display unit 18.

Herein, a certain range with the starting point 42 as the center is set as a dead region 46 in order to accurately recognize that the user has intentionally moved the instructing body 41. In this example, the range of the dead region 46 is set to a range within a rectangle which is 0.2x to 0.4x crosswise and 0.2y to 0.4y lengthwise with the starting point 42 as the center. Therefore, the control unit 15 does not draw the imaging assist line when the instructing body 41 has lost contact with the touch panel 21 within the range of the dead region 46.

FIG. 7B shows an example of a second recognition pattern in which the control unit 15 recognizes the starting point and the end point.

In the second recognition pattern, the control unit 15 gives an instruction to display the imaging assist line in the display unit 18 when the end point coordinate is included within a region having a predetermined angle with respect to a virtual line extending through the starting point coordinate in the lengthwise direction and the crosswise direction of the display unit 18 with the starting point coordinate as the center.

Also, in the second recognition pattern, the control unit 15 gives an instruction to not display the imaging assist line in the display unit 18 when the moving distance of the instructing body is within a range of 30% with respect to the length of the display unit 18 in the lengthwise direction. In this example, the length of one side of the touch panel 21 in the crosswise direction is represented as x. Then, when the end point coordinate is included within a region having a predetermined angle $\theta$ with respect to a virtual line 47 drawn in the crosswise direction with the starting point 42 as the center or within a region having a predetermined angle $\phi$ with respect to a virtual line 48 drawn in the lengthwise direction, an instruction is given to display the imaging assist line in the display unit 18. Herein, $\theta$ and $\phi$ may or may not be equal.

In order to accurately recognize that the user has intentionally moved the instructing body 41, a certain range with the starting point 42 as the center is set as a dead region 49. Therefore, the control unit 15 does not draw the imaging assist line when the instructing body 41 has lost contact with the touch panel 21 within the range of the dead region 49. In this example, the range of the dead region 49 is set to a range within a circle having a diameter of 0.3y with the starting point 42 as the center.

Note that the control unit 15 may perform an operation of erasing the displayed imaging assist line when the instructing body 41 contacts a region other than the region for instructing display of the imaging assist line and the dead regions 46 and 49 shown in FIGS. 7A and 7B.

With the imaging apparatus 100 according to this embodiment described above, the user can cause the imaging assist line to be displayed in the display unit 18 merely by stroking the touch panel 21 in a predetermined direction with the instructing body in contact while imaging. At this time, the imaging assist information can be displayed in the display unit 18 to reach at least two end portions of the screen, even when the instructing body is not moved to reach two end portions of the screen of a display portion of the display unit 18 and the starting point coordinate or the end point coordinate is not at the end portion of the screen of the display unit 18. Therefore, the user can cause the imaging assist line to be displayed while looking at an image of an object displayed in the display unit 18, thus providing an effect not only of immediacy but also of preventing interruption during an imaging operation.

Also, the imaging assist line can be displayed in the display unit 18 according to a desired position instructed by the user using the instructing body. At this time, an instruction to draw the imaging assist line can be given intentionally by stroking the touch panel 21 with the instructing body 41 in a range greater than the dead region. At this time, the imaging assist line is not drawn if the instructing body 41 loses contact with the touch panel 21 within the range of the dead region. Therefore, an accidental operation can be distinguished appropriately. Also, since the imaging assist line is not displayed by an accidental operation at the time of imaging, the imaging assist line can be displayed when and where appropriate to perform imaging.

Also, when a stroke by the instructing body 41 exceeds the dead region, the imaging assist line is displayed from end to end of the screen of the display unit 18 regardless of the moving distance of the instructing body 41. Therefore, it is unnecessary to move the instructing body 41 over the entire screen.

Also, when there is an operation of stroking the imaging assist line in a state where the imaging assist line is already displayed and the direction of the imaging assist line and the direction of the stroke operation match, the assist line is erased. Therefore, the user can erase the imaging assist line intuitively, thus preventing continuous display of an imaging assist line irrelevant at the time of imaging.

2. Modification Example

Note that although a display position at the time of displaying the imaging assist line is a position including the starting point in the embodiment described above, the control unit 15 may display the imaging assist line in a fixed manner in a position including the center of the display unit 18 or a position by which the display unit 18 is divided into a predetermined number in the lengthwise or crosswise direction. Also, the position of displaying the imaging assist line may be selectable in advance by the user. Also, when displaying in a position including the center or a position by which the display unit 18 is divided into three, the displaying may not only be in the direction of the stroke operation but also be both horizontal and vertical.

Also, when the imaging assist line is to be displayed in a position where the user has touched, the imaging assist line may be movable freely in accordance with the movement of the instructing body by contacting the displayed imaging assist line with the instructing body and moving the instructing body while in contact.

Also, when the imaging assist line is to be erased, the control unit 15 may not only erase an imaging assist line drawn in a direction which matches the stroking direction but also erase all imaging assist lines displayed in the display unit 18. Also, the control unit 15 may erase only an imaging assist line displayed in the display unit 18 in the vicinity of the starting point coordinate and the end point coordinate.

Also, the dead region may differ according to whether the user intends to display or erase imaging assist line. For example, providing a dead region when the imaging assist line is to be erased to be greater than a dead region when the imaging assist line is to be displayed can prevent an operation of accidentally erasing the imaging assist line.

Also, the line type of the imaging assist line is not limited to a solid line and may be a broken line, a dash-dotted line, a wavy line, or the like. Also, the color of the imaging assist line may be white, gray, red, or the like instead of black.

Also, a recording medium recording a program code of software for providing a function of the embodiment described above may be supplied to the imaging apparatus 100. Also, the function can obviously be provided also by reading out and executing a program code stored in a recording medium with the control unit 15.

The recording medium used for supplying the program code in this case may be, for example, a flexible disk, a hard disk, an optical disc, a magneto-optical disc, a CD-ROM, a CD-R, a magnetic tape, a nonvolatile memory card, or a ROM.

By the control unit 15 executing the program code which is read out, the function of the embodiment described above is provided. In addition, a part or all of the actual processing is performed by an OS or the like running on the control unit 15 based on an instruction of the program code. The function of the embodiment described above may also be provided through the processing.

The present application contains subject matter related to that disclosed in Japanese Priority Patent Application JP 2010-071704 filed in the Japan Patent Office on Mar. 26, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   an imaging unit configured to output an image signal;
   a detection unit configured to detect a coordinate of a contact position of an instructing body with respect to a display unit which displays an image based on the image signal; and
   a control unit configured to acquire from the detection unit a starting point coordinate of a starting point which is a position where the instructing body comes into contact with the display unit and an end point coordinate of an end point which is a position where the instructing body moves to and loses contact with the display unit and, when one of the starting point coordinate and the end point coordinate is not at an end portion of a screen of the display unit, cause imaging assist information for assisting imaging to be displayed in the display unit such that the imaging assist information reaches at least two end portions of the screen, wherein the control unit gives an instruction to erase the imaging assist information from the display unit when the instructing body has performed a predetermined operation with respect to the imaging assist information displayed in the display unit.

2. The imaging apparatus according to claim 1, wherein, when an instruction has been given with respect to the imaging assist information displayed in the display unit by the instructing body crossing a line segment connecting the starting point coordinate and the end point coordinate as the predetermined operation, the control unit gives an instruction to erase the imaging assist information crossed by the line segment.

3. The imaging apparatus according to claim 2, wherein the control unit gives an instruction to display in the display unit one of a horizontal line parallel to a crosswise direction of the display unit and a vertical line parallel to a lengthwise direction of the display unit which extends through the starting point coordinate and the end point coordinate as the imaging assist information.

4. The imaging apparatus according to claim 3, wherein the control unit gives an instruction to display the imaging assist information in the display unit when the end point coordinate is included within a region having a certain width in the lengthwise direction and the crosswise direction of the display unit with the starting point coordinate as a center.

5. The imaging apparatus according to claim 4, wherein the control unit gives an instruction to not display the imaging assist information in the display unit when a moving distance obtained from the starting point coordinate and the end point coordinate of the instructing body is within a range of 20% to 40% with respect to each side of the display unit in the lengthwise direction and the crosswise direction of the display unit.

6. The imaging apparatus according to claim 3, wherein the control unit gives an instruction to display the imaging assist information in the display unit when the end point coordinate is included within a region having a predetermined angle with respect to a virtual line extending through the starting point coordinate in the lengthwise direction and the crosswise direction of the display unit with the starting point coordinate as a center.

7. The imaging apparatus according to claim 6, wherein the control unit gives an instruction to not display the imaging assist information in the display unit when a moving distance obtained from the starting point coordinate and the end point coordinate of the instructing body is within a range of 30% with respect to a length of the display unit in the lengthwise direction.

8. The imaging apparatus according to claim 1, wherein the control unit displays the imaging assist information in a position by which the display unit is divided into a predetermined number in one of the lengthwise and crosswise directions.

9. The imaging apparatus according to claim 1, wherein the control unit gives an instruction to erase all of the imaging assist information from the display unit when the instructing body in contact has moved a predetermined distance obtained from the starting point coordinate and the end point coordinate along the imaging assist information displayed in the display unit as the predetermined operation.

10. The imaging apparatus according to claim 1, wherein the control unit performs one of a control of erasing the imaging assist information displayed in a vicinity of the starting point coordinate and the end point coordinate in the display unit and a control of erasing all of the imaging assist information displayed in the display unit when the predetermined operation is performed.

11. The imaging apparatus according to claim 1, wherein the control unit includes:
a coordinate acquisition unit configured to write the starting point coordinate out of coordinates received from the detection unit in a first storage region of a memory and overwrite a second storage region of the memory with the coordinate received in accordance with a movement of the instructing body continuously in contact with the display unit until the end point coordinate is reached; and
an instruction operation detection unit configured to detect that the instructing body has performed an instruction operation for instructing display of the imaging assist information in the display unit and give an instruction to display the imaging assist information corresponding to the instruction operation in the display unit when the instructing body reaches the end point coordinate and a moving distance obtained from the starting point coordinate and the end point coordinate read out from the memory is greater than or equal to a threshold value.

12. A non-transitory computer readable storage medium having instructions that when executed by a computer, cause the computer to execute the steps of:
outputting an image signal;
detecting a coordinate of a contact position of an instructing body with respect to a display unit which displays an image based on the image signal;
acquiring a starting point coordinate of a starting point which is a position where the instructing body comes into contact with the display unit and an end point coordinate of an end point which is a position where the instructing body moves to and loses contact with the display unit and, when one of the starting point coordinate and the end point coordinate is not at an end portion of a screen of the display unit, causing imaging assist information for assisting imaging to be displayed in the display unit such that the imaging assist information reaches at least two end portions of the screen, and
issuing from the computer an instruction to erase the imaging assist information from the display unit when the instructing body has performed a predetermined operation with respect to the imaging assist information displayed in the display unit.

* * * * *